(12) United States Patent
Tung et al.

(10) Patent No.: US 7,777,841 B2
(45) Date of Patent: Aug. 17, 2010

(54) PIXEL STRUCTURE OF A TRANSFLECTIVE LIQUID CRYSTAL PANEL HAVING A SINGLE GAP

(75) Inventors: Hsiu-Chi Tung, Taipei (TW); Li-Ping Liu, Kao-Hsiung (TW); Chih-Jen Hu, Hsinchu (TW); Chih-Ming Chang, Taoyuan County (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 860 days.

(21) Appl. No.: 11/550,401

(22) Filed: Oct. 17, 2006

(65) Prior Publication Data

US 2008/0030661 A1 Feb. 7, 2008

(30) Foreign Application Priority Data

Aug. 4, 2006 (TW) .............. 95128692 A (51) Int. Cl.
*G02F 1/1335* (2006.01)
(52) U.S. Cl. ..................................... 349/114
(58) Field of Classification Search .................. 349/114
See application file for complete search history.

(56) References Cited

U.S. PATENT DOCUMENTS 6,072,553 A * 6/2000 Mitsui et al. ................ 349/113
6,580,480 B2 * 6/2003 Baek et al. .................. 349/114
6,657,689 B2 * 12/2003 Baek ........................... 349/114
6,985,197 B2 * 1/2006 Chuang ....................... 349/114
2005/0094068 A1 * 5/2005 Ikeno et al. ................. 349/114
2005/0264720 A1 * 12/2005 Itou et al. .................... 349/99

FOREIGN PATENT DOCUMENTS

CN 1503030 A 6/2004

\* cited by examiner

*Primary Examiner*—Uyen-Chau N Le
*Assistant Examiner*—Hoang Tran
(74) *Attorney, Agent, or Firm*—Winston Hsu (57) ABSTRACT

A transflective liquid crystal display panel having a single gap is provided. The liquid crystal display panel has a first substrate, a second substrate substantially corresponding to the first substrate, and a liquid crystal layer disposed therebetween. The first substrate includes a plurality of pixel regions, and each pixel region has at least one reflection region covered with a reflective electrode and at least one transmission region. When voltage is not applied, the liquid crystal layer in the transmission regions and in the reflection regions has a phase difference of half wavelength, and when a voltage is applied, the liquid crystal layer in the transmission regions has no phase difference, and the liquid crystal layer in the reflection regions has a phase difference of quarter wavelength.

26 Claims, 13 Drawing Sheets

PIXEL STRUCTURE OF A TRANSFLECTIVE LIQUID CRYSTAL PANEL HAVING A SINGLE GAP

BACKGROUND OF THE INVENTION

1. Field of the Invention

The present invention relates to a pixel structure of a transflective liquid crystal panel, and more particularly, to a pixel structure of a transflective liquid crystal panel having a single cell gap.

2. Description of the Prior Art

Most liquid crystal displays (LCDs) can be categorized into the transmissive type, the reflective type, and the transflective type. The transmissive liquid crystal display uses backlight as a source for emitting light. The light emitted by the backlight will pass through the liquid crystal panel to let an observer see the image displayed on the liquid crystal display panel. The reflective liquid crystal display has a reflective electrode. When displaying the image, the ambient light of the reflective liquid crystal display will enter the liquid crystal display from the observer side of the liquid crystal display and then be reflected by the reflective electrode. The reflected light will pass through the liquid crystal panel again, and finally the observer can see the image displayed on the liquid crystal display. The transflective liquid crystal display has the liquid crystal display both of transmissive type and reflective type. In other words, each pixel region of the liquid crystal panel comprises a transmission region and a reflection region, wherein the transmission region uses a backlight, and the reflection region uses an ambient light as a light source.

Figure 1:
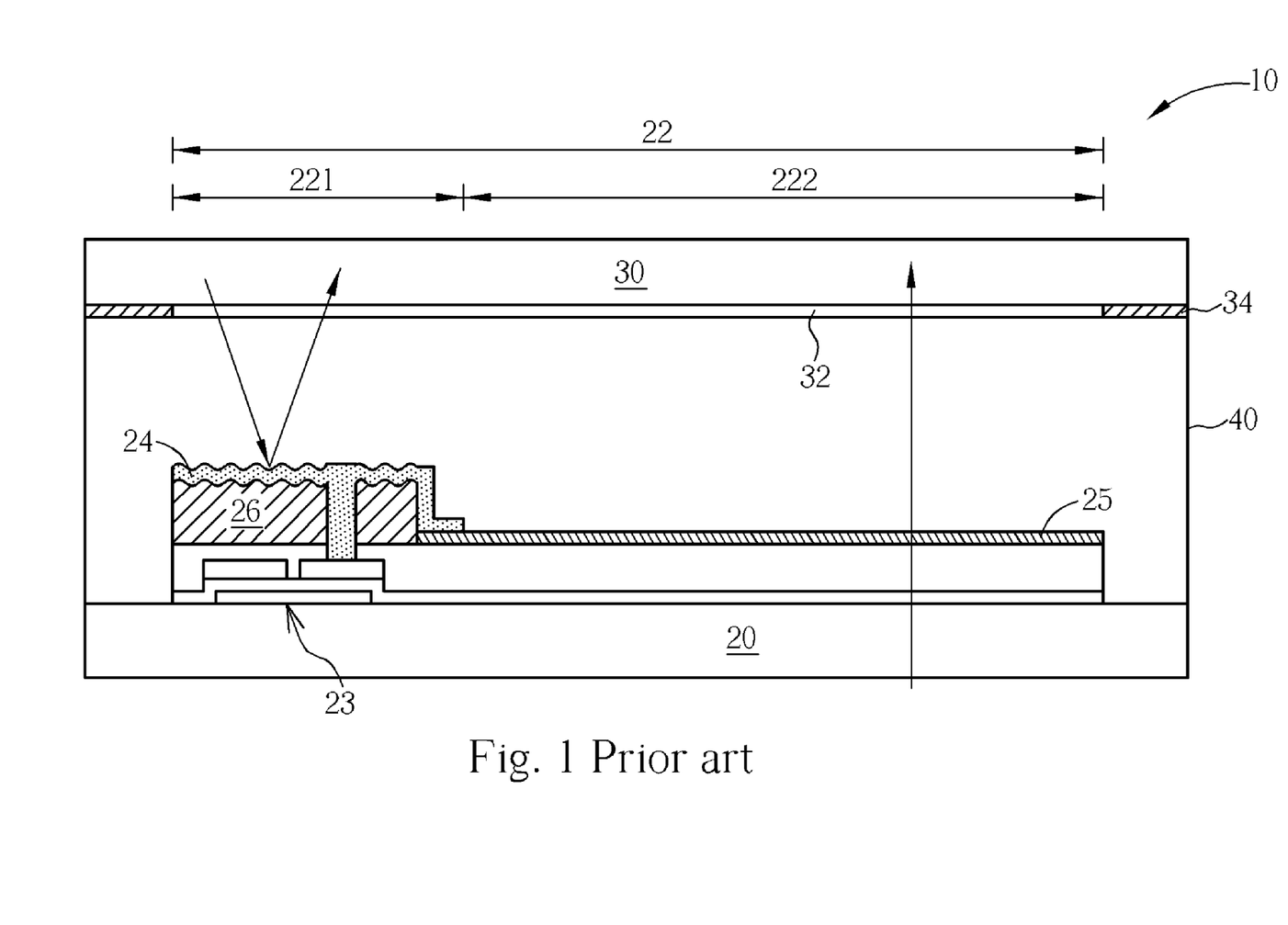
FIG. 1 is a schematic diagram of a traditional transflective liquid crystal panel.

Referring to FIG. 1, which is a schematic diagram of a traditional transflective liquid crystal panel. As shown in FIG. 1, traditional transflective liquid crystal panel 10 comprises an array substrate 20, a color filter substrate 30, and a liquid crystal layer 40 disposed between the array substrate 20 and the color filter substrate 30. The array substrate 20 comprises a plurality of pixel regions 22, and each of the pixel regions 22 comprises a reflection region 221 and a transmission region 222. The array substrate 20 also comprises a plurality of thin-film transistors 23, each thin-film transistor 23 disposed in each reflection region 221, a plurality of reflective electrodes 24 disposed on the thin-film transistors 23, and a plurality of transmissive electrodes 25 disposed in the transmission regions 222. Both of each reflective electrode 24 and each transmissive electrode 25 are electrically connected to each thin-film transistor 23 and controllably driven by each thin-film transistor 23. In addition, there is also a dielectric layer 26 disposed between the reflective electrode 24 and the thin-film transistor 23, and the dielectric layer 26 has a rough surface, so that the reflective electrode 24 can have a rough surface for scattering light beams.

The color filter substrate 30 comprises a plurality of color filters 32 disposed corresponding to the pixel region 22 and a black matrix 34 disposed corresponding to the edge of each pixel region 22.

Because the transmission region 222 of the transflective liquid crystal panel 10 uses a backlight, the light will pass through the liquid crystal layer 40 only once. The reflection region 221 uses the ambient light as a light source, so that the light will pass through the liquid crystal layer 40 twice. In such a case, because the phase difference in the reflection region 221 is twice as big as that in the transmission region 222, the relation of reflectance versus voltage mismatches the relation of transmittance versus voltage while driving the liquid crystal molecules. For this reason, the traditional transflective liquid crystal panel 10 uses a design of a double cell gap to solve the mismatching problem. More specifically, in the traditional transflective liquid crystal panel 10, a function of the dielectric layer 26 is disposed under the reflective electrode 24 so as to adjust a cell gap of the liquid crystal layer 40. By disposing the dielectric layer 26, the cell gap of the liquid crystal layer 40 in the reflection region 221 is smaller than the cell gap in the transmission region 222, so that the phase difference of light passing through the reflection region 221 is the same with that of light passing through the transmission region 222. Then, the mismatched problem of driving voltages in the reflection region 221 and in the transmission region 222 is improved. However, a step of fabricating the dielectric layer 26 in the reflection region 221 has to be increased in the double cell gap design of the transflective liquid crystal panel 10. Further, the increased step not only increases process time and cost, but also affects product yield. Importantly, a gap of the border between the reflection region 221 and the transmission region 222 will make the liquid crystal molecules difficult to align, thereby lowering the quality of displayed images.

SUMMARY OF THE INVENTION

It is therefore an objective of the present invention to provide a pixel structure of a transflective liquid crystal panel having a single cell gap so as to increase the matching level of transmittance versus voltage and the matching of reflectance versus voltage.

According to an embodiment of the present invention, a pixel structure of a transflective liquid crystal panel having a single cell gap is provided. The pixel structure of a transflective liquid crystal panel comprises a first substrate and a second substrate disposed opposite to the first substrate, wherein the first substrate has a plurality of pixel regions, each of the pixel regions comprises at least one reflection region covered with a reflective electrode and at least one transmission region; a liquid crystal layer disposed between the first substrate and the second substrate; a first quarter-wave plate disposed on a lower surface of the first substrate; a first polarizer disposed under the first quarter-wave plate, and the first polarizer having a first transmissive axis; a second quarter-wave plate disposed on an upper surface of the second substrate; and a second polarizer disposed on the second quarter-wave plate, and the second polarizer has a second transmissive axis, wherein the second transmissive axis of second polarizer is substantially parallel to the first transmissive axis of the first polarizer. As no voltage is applied, the liquid crystal layer in the transmission region and in the reflection region have a phase difference of half wavelength, and as a voltage is applied, the liquid crystal layer in the transmission region has no phase difference, and the liquid crystal layer in the reflection region has a phase difference of quarter wavelength.

A detailed description is given in the following embodiments with reference to the accompanying drawings.

The present invention will become more fully understood from the detailed description given hereinbelow and the accompanying drawings, given by way of illustration only and thus not intended to be limitative of the present invention.

DETAILED DESCRIPTION

The following description is of the best-contemplated mode of carrying out the present invention. This description is made for the purpose of illustrating the general principles of the present invention and should not be taken in a limiting sense. The scope of the present invention is best determined by reference to the appended claims.

Figure 2:
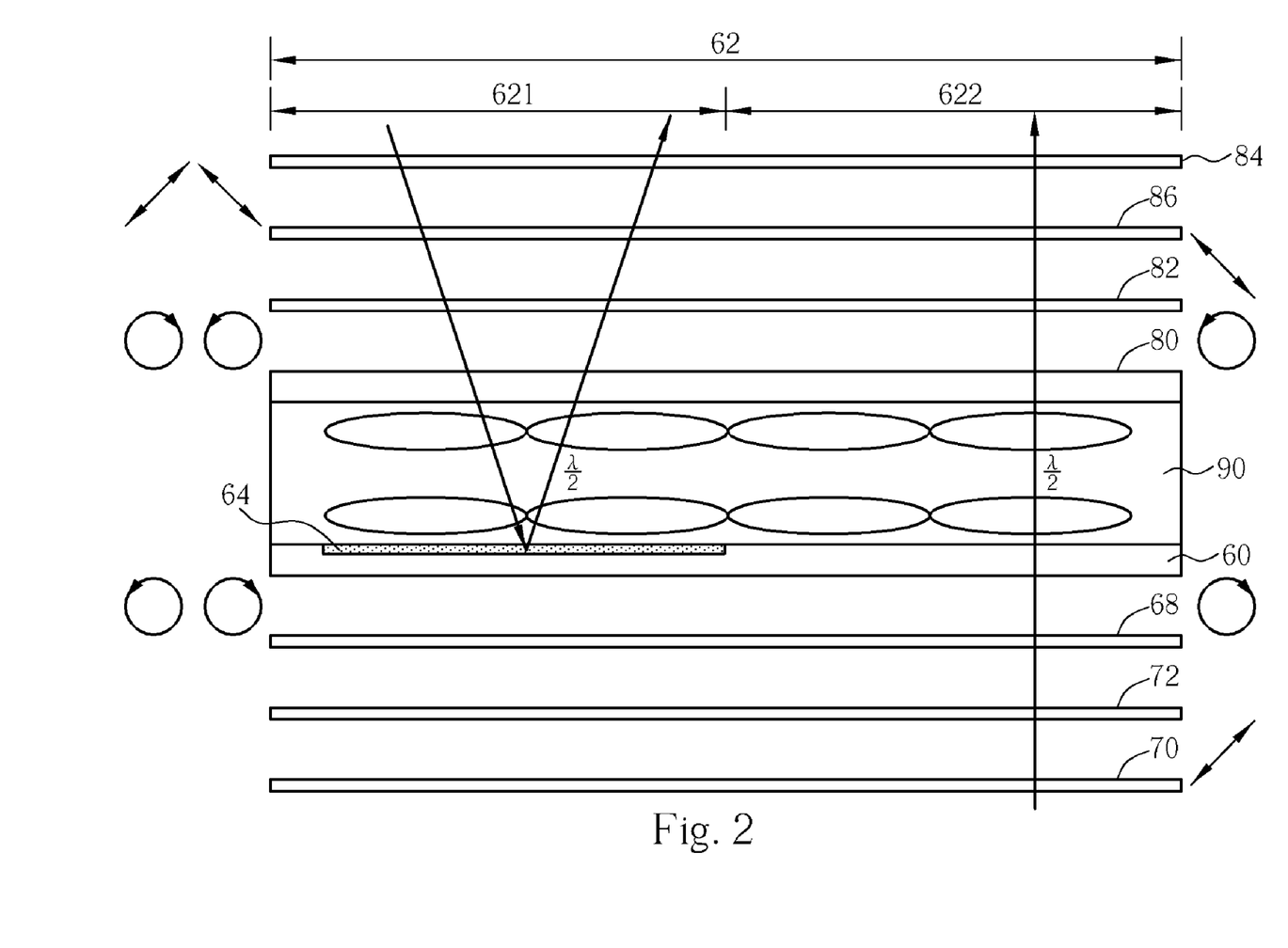
FIG. 2 and FIG. 3 are schematic diagrams of pixel structures of a transflective liquid crystal panel having a single cell gap according to a first embodiment of the present invention.
Figure 3:
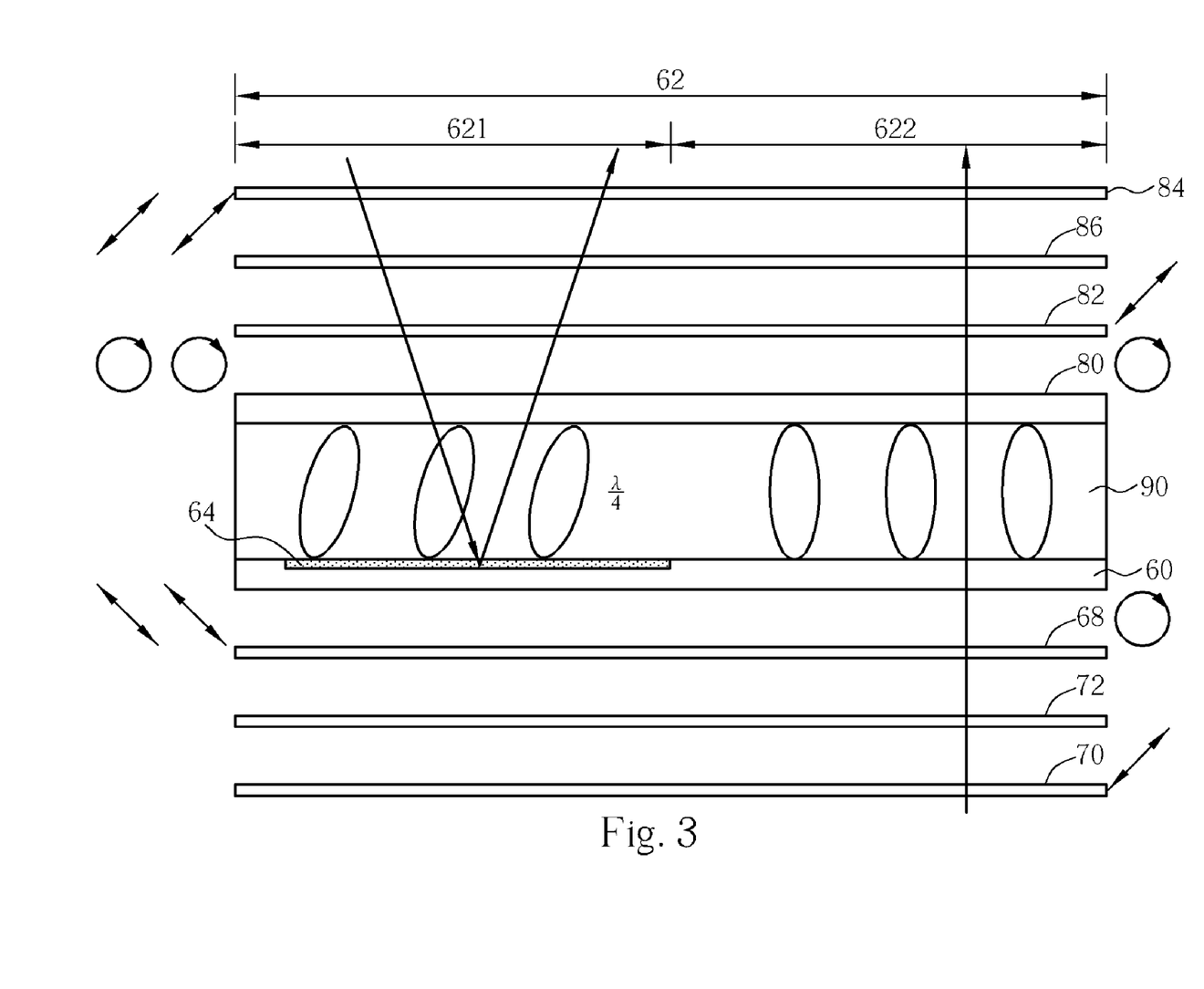

FIGS. 2 and 3 are schematic diagrams of pixel structures of a transflective liquid crystal panel having a single cell gap according to a first embodiment of the present invention. FIG. 2 is a schematic diagram of the transflective liquid crystal panel in the condition of not applying a voltage, whereas FIG. 3 is a schematic diagram of the transflective liquid crystal panel in the condition of applying a voltage. As shown in FIG. 2 and FIG. 3, the transflective liquid crystal panel 50 according to the embodiment of the present invention comprises a first substrate (such as array substrate) 60, a second substrate (such as color filter substrate) 80 disposed on the first substrate 60 and substantially corresponding to the first substrate 60, and a liquid crystal layer 90 disposed between the first substrate 60 and the second substrate 80. Because a liquid crystal panel of the present invention is a transflective liquid crystal panel, its pixel structure comprises at least two parts, such as the reflection region and the transmission region. As shown in FIG. 2 and FIG. 3, the first substrate 60 comprises a plurality of pixel structures 62, and each of the pixel structures 62 comprises at least one reflection region 621 and at least one transmission region 622. There is a reflective electrode 64 disposed in the reflection region 621 that is used to drive liquid crystal molecules in the reflection region 621 and reflects ambient light. There is a transmissive electrode (not shown in FIG. 2 and FIG. 3) disposed in the transmission region 622 that is used to drive the liquid crystal molecules in the transmission region 622 and allows the light emitted from a backlight to pass therethrough.

The transflective liquid crystal panel 50 according to the embodiment of the present invention also comprises a first quarter-wave plate 68 disposed on a lower surface of the first substrate 60, a first polarizer 70 disposed on the other side of the first quarter-wave plate 68 opposite to the lower surface of the first substrate 60, a second quarter-wave plate 82 disposed on an upper surface of the second substrate 80, and a second polarizer 84 disposed on the other side of the second quarter-wave plate 82 opposite to the upper surface of the second substrate 80. The first polarizer 70 has a first transmissive axis, and the second polarizer 84 has a second transmissive axis. The first transmissive axis of the first polarizer 70 and the second transmissive axis of the second polarizer 84 are substantially parallel to each other. In addition, in order to increase contrast and color, a first half-wave plate 72 can be selectively disposed between the first quarter-wave plate 68 and the first polarizer 70, and a second half-wave plate 86 can be selectively disposed between the second quarter-wave plate 82 and the second polarizer 84.

Thereafter, for two conditions of displaying images and not displaying images, the operational condition of the pixel structure of the transflective liquid crystal panel 50 is described respectively. It is essential to say that the embodiment of the present invention uses a transflective liquid crystal panel of normally black as an example. As shown in FIG. 2, as no voltage is applied, the liquid crystal layer 90 has a phase difference of half wavelength. In the transmission region 622, the light (as indicated arrow in the transmission region) emitted from the backlight will pass through the first polarizer 70, the first half-wave plate 72, the first quarter-wave plate 68, liquid crystal layer 90, the second quarter-wave plate 82, the second half-wave plate 86, and the second polarizer 84 in turn. The change of polarization direction of the light emitted from the backlight passing through the above-mentioned optical film is stated as follows. Refer to the sign mark near the transmission region 622 in FIG. 2. First, after the light is emitted into the first polarizer 70, only a first linear polarized light, such as S polarized light, being substantially parallel to the first transmissive axis of the first polarizer 70 will pass through. Because the first linear polarized light is a linear polarized light, the polarization direction will not be changed after passing through the first half-wave plate 72. Then, after passing through the first quarter-wave plate 68, the first linear polarized light will be transformed into a first rotatory polarized light such as left rotatory polarized light. In the condition of not applying the voltage, the liquid crystal layer 90 is substantially equal to a half-wave plate, so that the first rotatory polarized light will be transformed into a second rotatory polarized light, such as right rotatory polarized light, after passing through the liquid crystal layer 90. The second rotatory polarized light will be transformed into a second linear polarized light, such as P polarized light, after passing through the second quarter-wave plate 82. Similarly, the second linear polarized light will not be changed while passing through the second half-wave plate 86. Because the second transmissive axis of the second polarizer 84 is substantially parallel to the first transmissive axis of the first polarizer 70, the second linear polarized light cannot pass through the second polarizer 84. Therefore, the transmission region 622 shows a black state at this time.

On the other hand, in the reflection region 621, an ambient light will pass through the second polarizer 84, the second half-wave plate 86, the second quarter-wave plate 82, liquid crystal layer 90, and be reflected by the reflective electrode 64 to pass through the second quarter-wave plate 82, the second half-wave plate 86, and the second polarizer 84 in turn. While passing through the above-mentioned optical film, the change of polarization direction of the ambient light is stated as follows. Refer to the sign mark near the reflection region 621 in FIG. 2. First, after the ambient light is emitted into the second polarizer 84, only a first linear polarized light substantially parallel to the second transmissive axis of the second polarizer 84 will pass through. Because the first linear polarized light is a linear polarized light, the polarization direction will not be changed after passing through the second half-wave plate 86. Then, after passing through the second quarter-wave plate 82, the first linear polarized light will be transformed into a first rotatory polarized light. In the condition of not applying the voltage, the liquid crystal layer 90 is substantially equal to a half-wave plate, so that the first rotatory polarized light will be transformed into a second rotatory polarized light after passing through the liquid crystal layer 90. The second rotatory polarized light will be transformed into the first rotatory polarized light after being reflected by the reflective electrode 64. The first rotatory polarized light will be transformed into the second rotatory polarized light after passing through the liquid crystal layer 90 again. The second rotatory polarized light will be transformed into a second linear polarized light after passing through the second quarter-wave plate 82. The second linear polarized light will not be changed while passing through the second half-wave plate 86. Because the second transmissive axis of the second polarizer 84 is substantially parallel to the first transmissive axis of the first polarizer 70, and the second polarizer 84 only allows the first linear polarized light to pass through, the second linear polarized light cannot pass through the second polarizer 84. Therefore, the reflection region 621 also shows a black state at the time.

As shown in FIG. 3, as a voltage is applied, the liquid crystal layer 90 in the transmission region 622 will be transformed into no phase difference, and the liquid crystal layer 90 in the reflection region 621 will be transformed into a phase difference of quarter wavelength. In the situation, in the transmission region 622, the light emitted from the backlight also will pass through the first polarizer 70, the first half-wave plate 72, the first quarter-wave plate 68, liquid crystal layer 90, the second quarter-wave plate 82, the second half-wave plate 86, and the second polarizer 84 in turn. It is essential to say that the liquid crystal layer 90 in the transmission region 622 will be transformed into no phase difference while applying a voltage. When the light emitted from the backlight is passing through the above-mentioned optical film, the statement of polarizing situation happening is as follows. First, the light will enter the first polarizer 70, and then, a first linear polarized light is substantially parallel to the first transmissive axis will pass through. The polarization direction of the first linear polarized light will not be changed after passing through the first half-wave plate 72. Then, after passing through the first quarter-wave plate 68, the first linear polarized light will be transformed into a first rotatory polarized light. Differing from the condition of not applying the voltage, the liquid crystal layer 90 in the transmission region 622 has no phase difference in the condition of applying the voltage. Therefore, the first rotatory polarized light will not be affected and still be the first rotatory polarized light after passing the liquid crystal layer 90. The first rotatory polarized light will be transformed into the first linear polarized light after passing through the second quarter-wave plate 82. Similarly, the first linear polarized light will not be affected while passing through the second half-wave plate 86. Because the second transmissive axis of the second polarizer 84 is substantially parallel to the first transmissive axis of the first polarizer 70 so as to the first linear polarized light can pass through the second polarizer 84. Therefore, the transmission region 622 shows a white state at the time.

On the other hand, in the reflection region 621, an ambient light will pass through the second polarizer 84, the second half-wave plate 86, the second quarter-wave plate 82, liquid crystal layer 90, and be reflected by the reflective electrode 64 to pass through the second quarter-wave plate 82, the second half-wave plate 86, and the second polarizer 84 in turn. Because as a voltage is applied across the liquid crystal layer 90 in the reflection region 621, a phase difference of the liquid crystal layer 90 will be transformed from half wavelength to quarter wavelength. When the ambient light is passing through the above-mentioned optical film, the statement of polarizing situation is as follows. First, after the ambient light is emitted into the second polarizer 84, only a first linear polarized light is substantially parallel to the second transmissive axis will pass through. After the first linear polarized light passes through the second half-wave plate 86, the polarization direction will not be changed. Then, after passing through the second quarter-wave plate 82, the first linear polarized light will be transformed into a first rotatory polarized light. In the condition of applying a voltage, the liquid crystal layer 90 is substantially equal to a quarter-wave plate, so that the first rotatory polarized light will be transformed into a second linear polarized light after passing through the liquid crystal layer 90. The second linear polarized light will still be the second linear polarized light after being reflected by the reflective electrode 64, and the second linear polarized light will pass through the liquid crystal layer 90 again and be transformed into a first rotatory polarized light. The first rotatory polarized light will be transformed into a first linear polarized light after passing through the second quarter-wave plate 82. Then, the first linear polarized light will not be affected while passing through the second half-wave plate 86. Because the second transmissive axis of the second polarizer 84 is substantially parallel to the first transmissive axis of the first polarizer 70, and the second polarizer 84 allows the first linear polarized light to pass through, the first linear polarized light can pass through the second polarizer 84. Therefore, the reflection region 621 also shows a white state at the time.

According to the above-mentioned embodiment, the present invention having a pixel structure of a transflective liquid crystal panel of a single cell gap can transform the phase difference of the liquid crystal layer in the transmission region from half wavelength to about zero and transform the phase difference of the liquid crystal layer in the reflection region from half wavelength to quarter wavelength. Therefore, a transmittance of the liquid crystal layer in the transmission region and a reflectance of the liquid crystal layer in the reflection region can be respectively controlled so as to have good matches of transmittance versus voltage and reflectance versus voltage.

Figure 4:
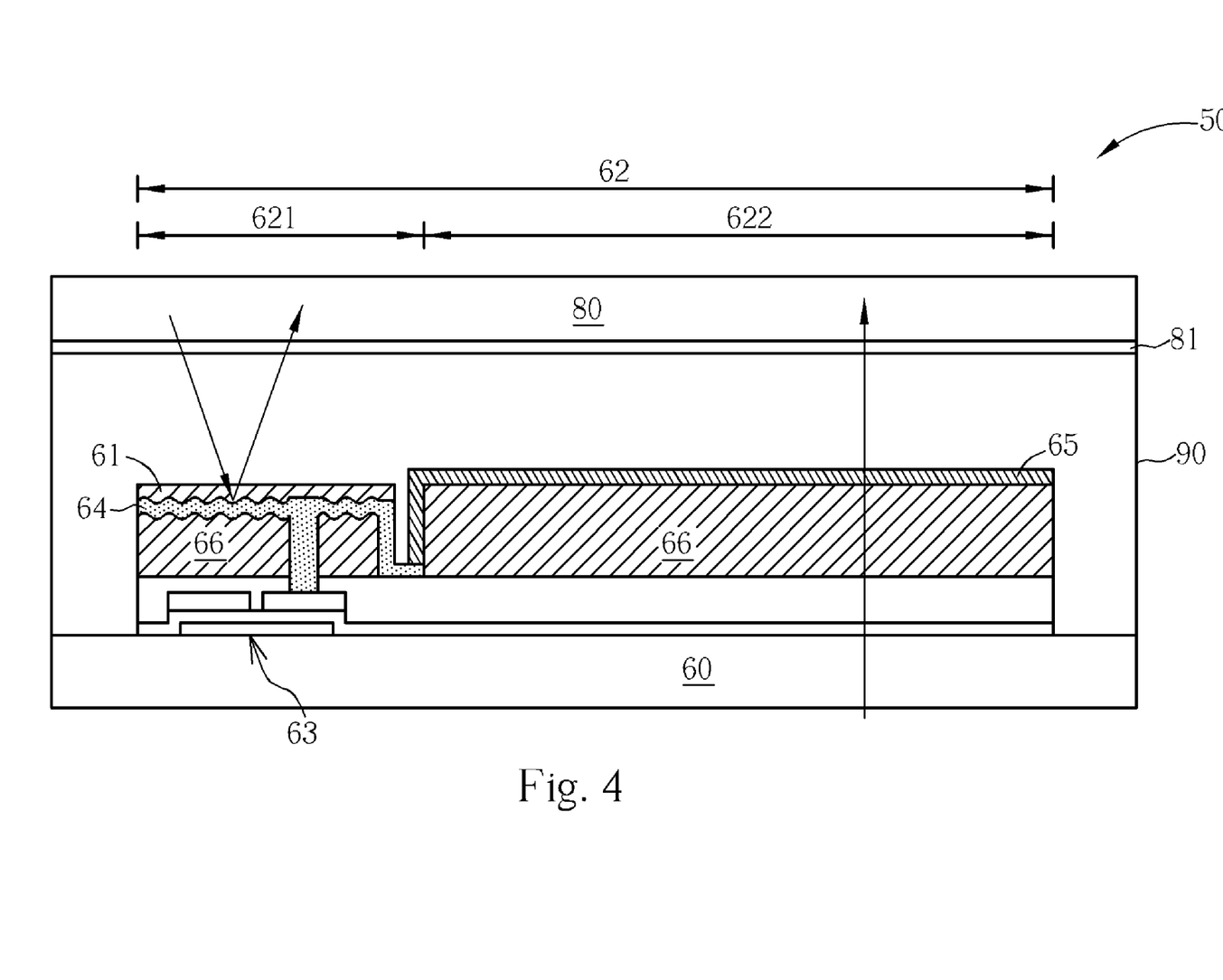
FIG. 4 and FIG. 5 are schematic diagrams of voltage dividing structures of the normally black transflective liquid crystal panel of the present invention.
Figure 5:
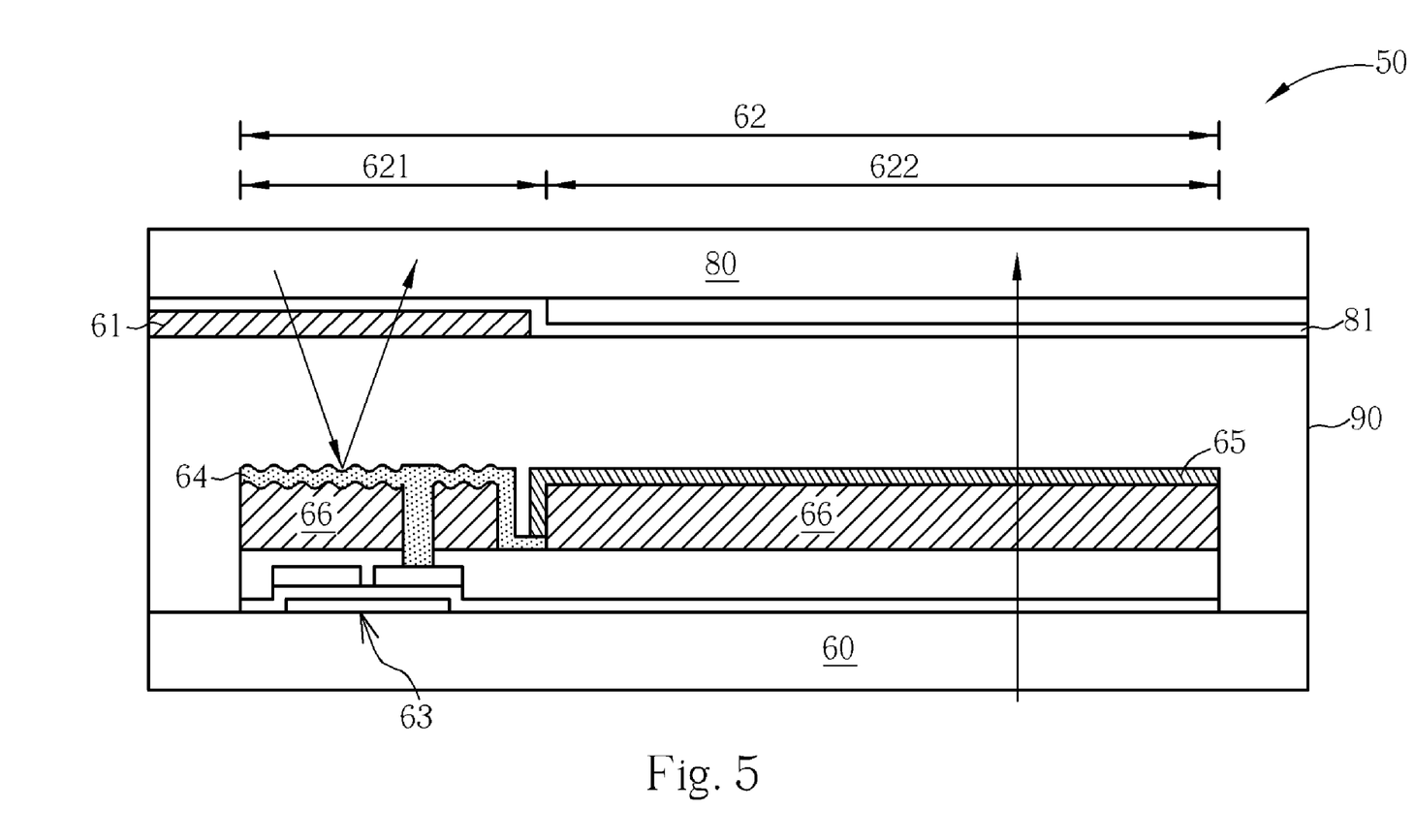

A normally black transflective liquid crystal panel according to the above-mentioned embodiment of the present invention can achieve the effect of respectively controlling the transmission region and the reflection region by the way of voltage dividing. Refer to FIG. 4 and FIG. 5, which are schematic diagrams of voltage dividing structures of the normally black transflective liquid crystal panel of the present invention. In order to clearly understand a characteristic of the present invention, refer to FIG. 2 and FIG. 3 together, and the devices in FIG. 2 to FIG. 5 will use the same reference characters. As shown in FIG. 4, a first substrate 60 of a transflective liquid crystal panel 50 comprises a plurality of thin-film transistors 63, each thin-film transistor 63 disposed below each reflection regions 621, a plurality of reflective electrodes 64, such as aluminum electrode, disposed on the thin-film transistors 63 and a plurality of transmissive electrodes 65, such as indium tin oxide (ITO) electrode, disposed in the transmission regions 622. The reflective electrode 64 and the transmissive electrode 65 are connected to each other and are electrically connected to the drain of the thin-film transistor 63 is adapted to receive a voltage from the thin-film transistor 63 to drive the liquid crystal molecules of the liquid crystal layer 90. Wherein the structure of the thin-film transistor 63 comprises a gate (not mark), a gate insulating layer (not mark) disposed on the gate, an active layer disposed on a part of the gate insulating layer, and the active layer comprises at least one channel layer and at least one doped silicon layer disposed on the channel layer, a source/drain disposed on a part of the active layer (not mark) and distant from each other with a gap, a passivation layer (not mark) covering the source/drain and a part of the upper surface of the first substrate 60, and a pixel electrically connected to one of the source/drain via a hole of passivation layer. In additional, the pixel electrode comprises at least one reflective electrode 64 and at least one transmissive electrode 65 being the different portion 621, 622. The transflective liquid crystal panel 50 also comprises a dielectric layer 66 disposed under the reflective electrode 64 and the transmission electrode 65. Moreover, the dielectric layer 66 under the reflective electrode 64 can have a rough surface to increase scattering effect of the reflective electrode 64. In addition, a surface of a second substrate 80 facing the first substrate 60 is disposed a common electrode layer 81, and the surface of the reflective electrode 64 is further covered with a voltage dividing insulating layer 61 so as to adjust the voltage of the reflection region 621.

FIG. 5 is a schematic diagram of a voltage dividing structure of normally black transflective liquid crystal panel of the present invention. The difference with the shown in FIG. 4 is that the voltage dividing insulating layer 61 is disposed on the lower surface of the second substrate 80 in the reflection region 621, not in the first substrate 60.

It is essential to say that the transflective liquid crystal panel of the present invention also can normally be a white transflective liquid crystal panel. In the situation, the first transmissive axis of the first polarizer 70 and the second transmissive axis of the second polarizer 84 can be disposed substantially intersecting with each other such as substantially perpendicular, or disposed to be not parallel with each other, and cooperate with a compensated film to correct the polarized angle of the light. Besides, refer to the following embodiment about a voltage dividing structure of the normally white transflective liquid crystal panel.

Figure 6:
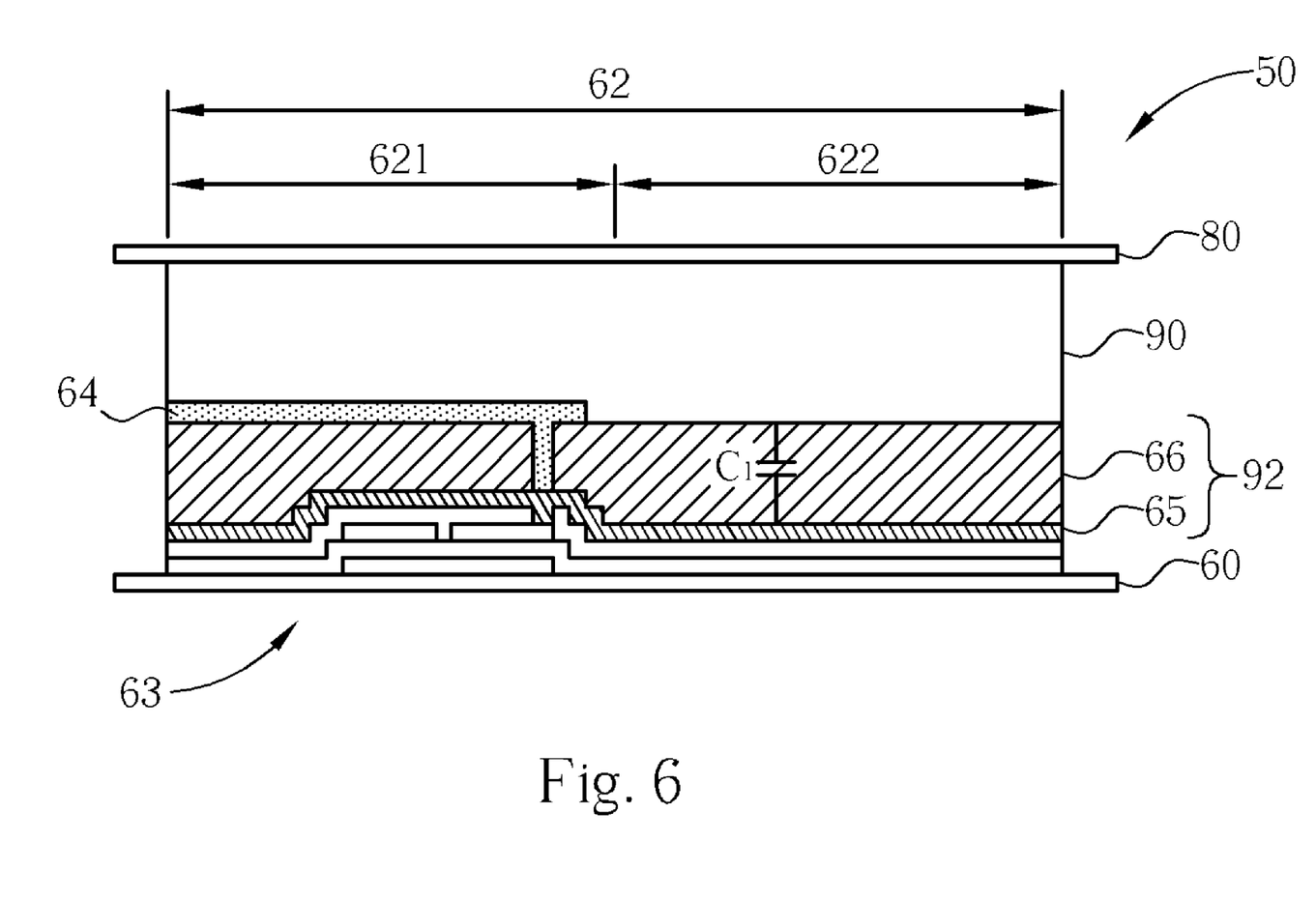
FIG. 6 is a schematic diagram of a voltage dividing structure according to second embodiment of the present invention.

FIG. 6 is a schematic diagram of a voltage dividing structure according to a second embodiment of the present invention. As shown in FIG. 6, the first substrate 60 of the transflective liquid crystal panel 50 comprises a plurality of thin-film transistors 63, each thin-film transistor 63 disposed below each reflection regions 621, a plurality of the reflective electrodes 64, such as aluminum electrode, disposed on the thin-film transistors, a plurality of transmissive electrodes 65, such as indium tin oxide (ITO) electrode, disposed in the transmission regions 622, and a plurality of voltage dividing structures 92 disposed in each of the pixel regions 62 of the first substrate 60, respectively. The reflective electrode 64 and the transmissive electrode 65 are connected to each other and are electrically connected to the drain of the thin-film transistor 63 is adapted to receive a voltage of the thin-film transistor 63 to drive liquid crystal molecules. The voltage dividing structure 92 comprises at least one capacitor having a first electrode (the first electrode also as the transmissive electrode 65 of the transflective liquid crystal panel) and at least one dielectric layer 66 disposed between the first electrode and the liquid crystal layer 90, and the dielectric layer 66 has a first thickness.

Figure 7:
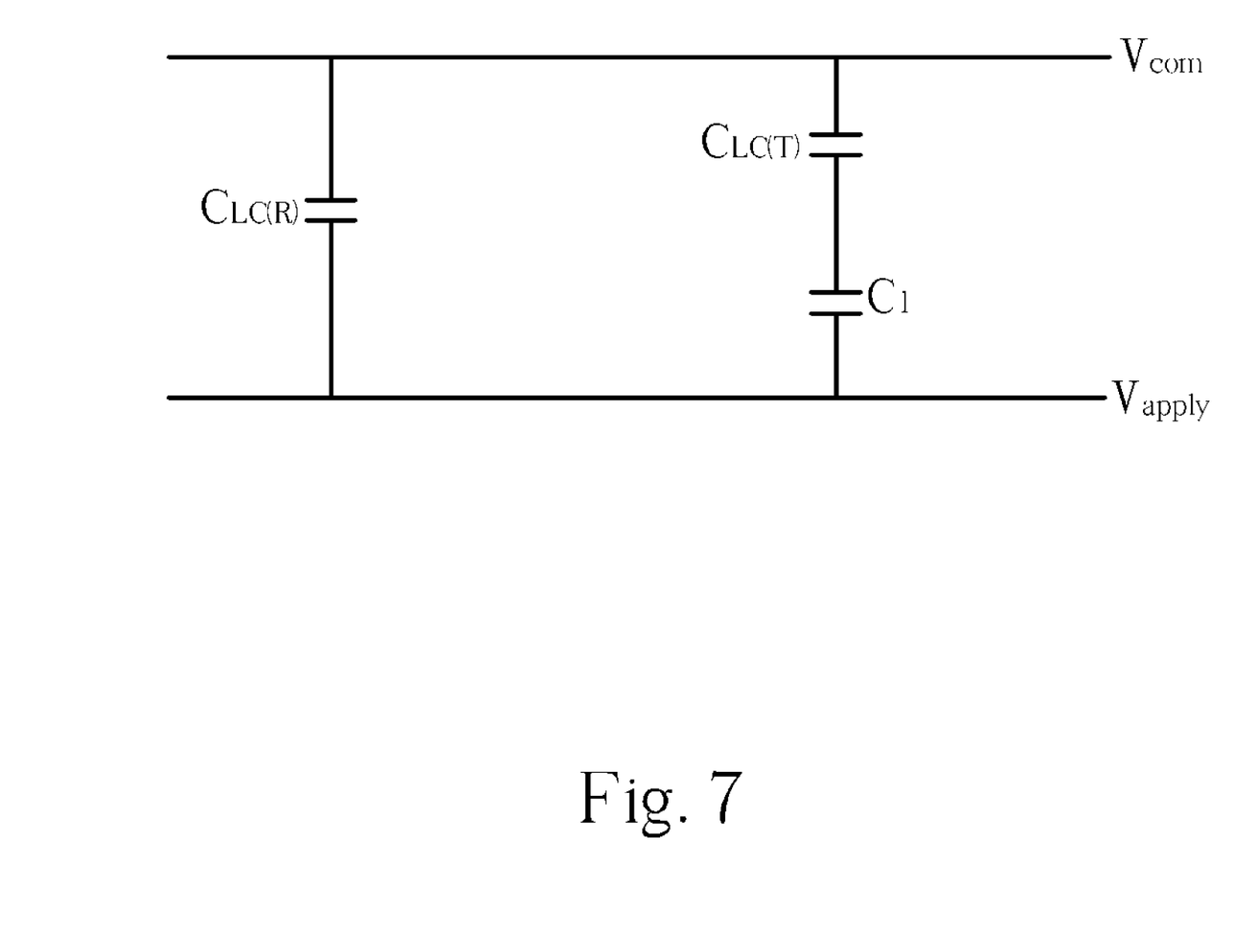
FIG. 7 is a schematic circuit diagram of the voltage dividing structure shown in FIG. 6.

FIG. 7 is a schematic circuit diagram of the voltage dividing structure shown in FIG. 6. As shown in FIG. 6 and FIG. 7, the drain of the thin-film transistor 63 of the first substrate 60 provides a pixel voltage ($V_{apply}$) to the reflective electrode 64 and the transmissive electrode 65. In addition, in the condition of the common electrode (not shown in FIG. 4) of the second substrate 80 having a common voltage ($V_{com}$), the liquid crystal layer 90 can be regarded as a dielectric layer, so that there exists a liquid crystal capacitor ($C_{LC}$) between the reflective electrode 64 of the reflection region 621 and the common electrode. Furthermore, because the liquid crystal layer 90 and the dielectric layer 66 exist simultaneously between the transmissive electrode 65 and the common electrode in the transmission region 622, the structure can be regarded as having a liquid crystal capacitor and a first capacitor $C_1$ connected to each other in the transmission region 622.

According to the voltage dividing structure shown in FIG. 6, the first capacitor $C_1$ and the liquid crystal capacitor in the transmission region 622 are connected in series, not in the reflection region 621, so that a voltage ($V_{LC(T)}$) in the transmission region 622 and a voltage ($V_{LC(R)}$) in the reflection region 621 of the liquid crystal molecules can be derived as follows:

$$Q_{total} = [(C_1 * /C_{LC}(T))/(C_1 + C_{LC}(T))] * (V_{apply} - V_{com})$$

$$V_{LC}(T) = Q_{total}/C_{LC}(T) = (C_1 * (V_{apply} - V_{com}))/(C_1 + C_{LC(T)})$$

$$V_{LC}(R) = (V_{apply} - V_{com})$$

wherein $Q_{total}$ represents the total electric charge of the transmission region.

As mentioned above, the voltage dividing structure design can make the liquid crystal voltage of the reflection region 621 is substantially equal to the pixel voltage. Adjusting the first capacitor $C_1$, such as adjusting thickness and square measure of the dielectric layer 66, or choosing the dielectric materials has the different dielectric constant, can make the liquid crystal voltage of the transmission region 622 be adjusted to a suitable number so as to let the driving voltage in the transmission region 622 and in the reflection region 621 match mutually. The dielectric layer 66 is not limited to be a single layer structure but can be a multilayer structure. Its material can depend on requirements of the capacitor value to choose organic materials, inorganic materials, or combinations thereof. The organic materials comprise organic silicon compounds, photoresist, polyethyleneoxide, polyethylene terephthalate (PET), polyethylene, or likes. The inorganic materials comprise silicon oxide, silicon nitride, silicon oxynitride, silicon carbon, or likes.

Figure 8:
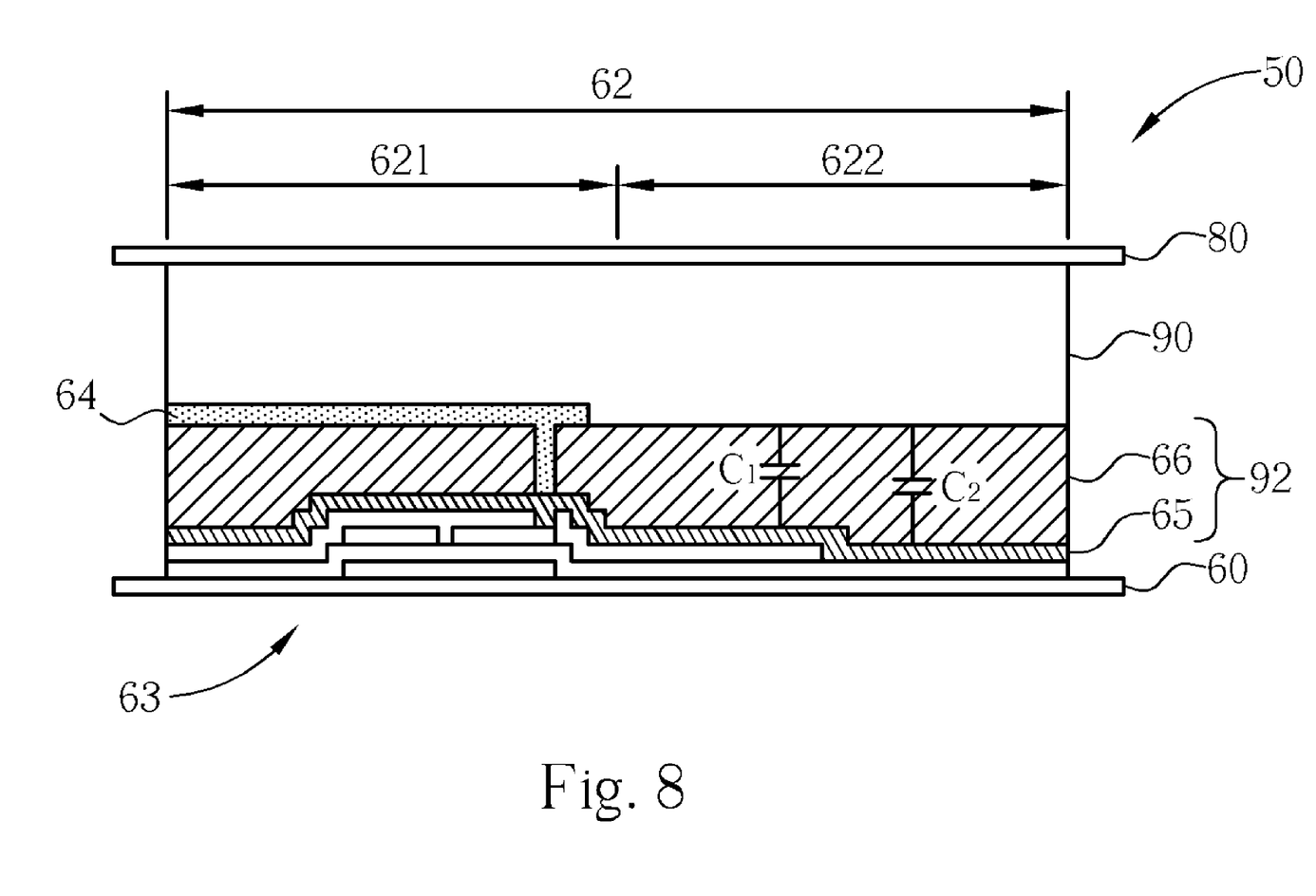
FIG. 8 is a schematic diagram of the voltage dividing structure according to third embodiment of the present invention.

FIG. 8 is a schematic diagram of the voltage dividing structure according to a third embodiment of the present invention. The difference with the shown in FIG. 6 is that voltage dividing structure of the present embodiment has two capacitors. As shown in FIG. 8, the capacitor of the voltage dividing structure 92 comprises not only a first capacitor $C_1$ but also a second capacitor $C_2$. The first capacitor $C_1$ and second capacitor $C_2$ are formed by different thicknesses of the dielectric layer 66. A method of the embodiment of the present invention uses a stepped structure between a gate insulating layer of the thin-film transistor 63 and the dielectric layer 66 in the transmission region 622 to make a thickness variation of the dielectric layer 66. In other words, the dielectric layer 66 has a step structure, and the dielectric layer 66 in the transmission region 622 has a first thickness and a second thickness so as to form the first capacitor $C_1$ and the second capacitor $C_2$. In other words, the passivation layer exposed the partly of the gate insulating layer covers the first substrate 60 to formed the step structure. For an electrically connected method, the first capacitor $C_1$ and the second capacitor $C_2$ are connected in parallel and then connected to the liquid crystal capacitor in series. The first capacitor $C_1$ in the embodiment of the present invention is located in the transmission region 622 and adjacent to a position of the reflective electrode 64. In addition, it is essential to say that the relation between the capacitance value and the thickness of the dielectric layer 66 is an inverse ratio. Therefore, the first thickness is substantially smaller than the second thickness, so that the first capacitor $C_1$ is substantially larger than the second capacitor $C_2$.

Figure 9:
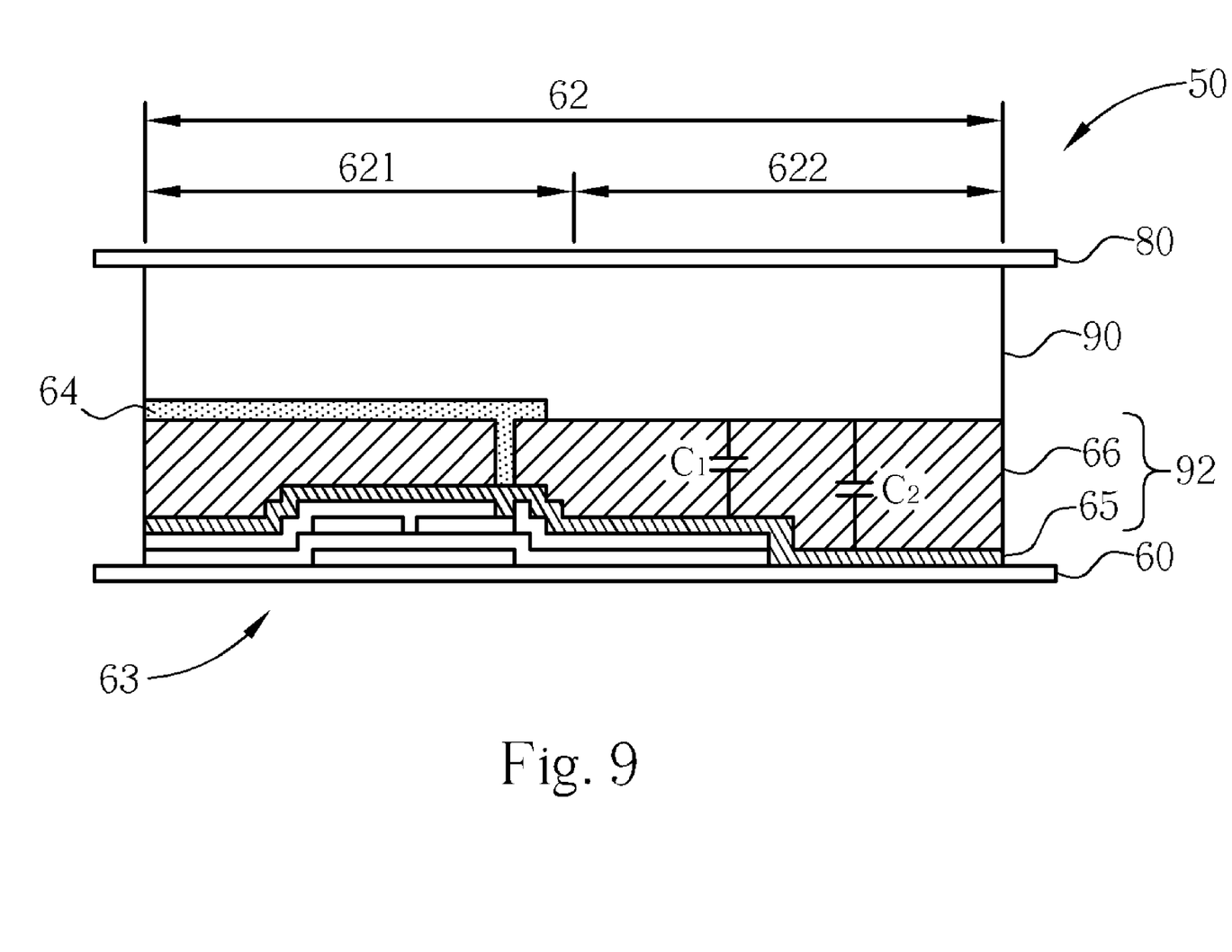
FIG. 9 is a schematic diagram of the voltage dividing structure according to fourth embodiment of the present invention.

FIG. 9 is a schematic diagram of the voltage dividing structure according to a fourth embodiment of the present invention. The voltage dividing structure of the embodiment is similar to a previous embodiment. The difference therebetween is that the embodiment uses a stepped structure between the gate insulating layer of the thin-film transistor 63 and the dielectric layer 66 in the transmission region 622 to make the dielectric layer 66 in a different position of the transmission region 622 have a first thickness and a second thickness so as to form the first capacitor and the second capacitor. In other words, both the gate insulating layer and the passivation layer are exposed the part of the first substrate 60 to form the stepped structure of the dielectric layer 66.

Figure 10:
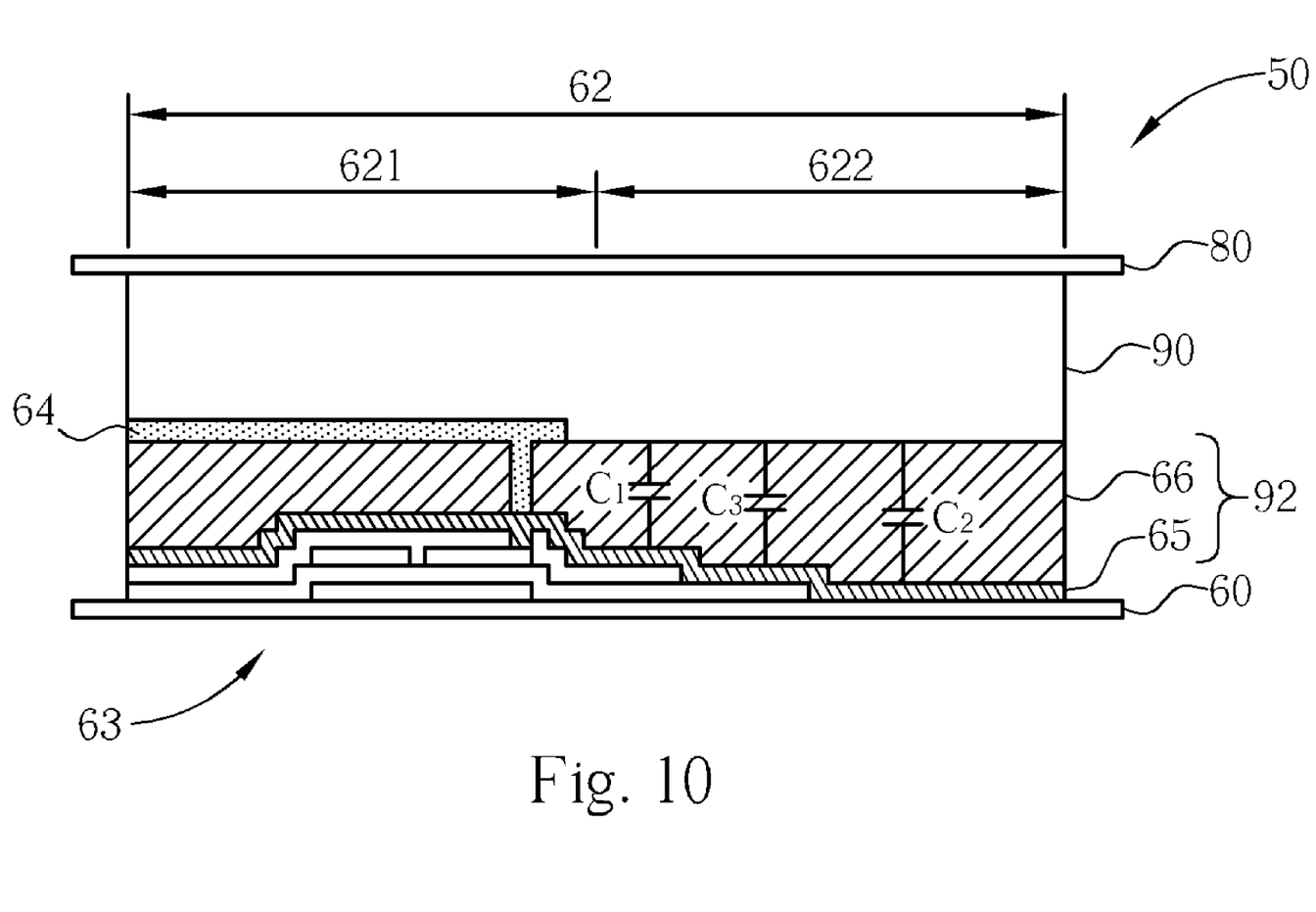
FIG. 10 is a schematic diagram of the voltage dividing structure according to fifth embodiment of the present invention.

FIG. 10 is a schematic diagram of the voltage dividing structure according to fifth embodiment of the present invention. The voltage dividing structure of the embodiment has three capacitors. As shown in FIG. 10, the capacitor of the voltage dividing structure 92 comprises not only a first capacitor $C_1$ and a second capacitor $C_2$ but also a third capacitor $C_3$ between the first capacitor $C_1$ and the second capacitor $C_2$. The first capacitor $C_1$, the second capacitor $C_2$ and the third capacitor $C_3$ are formed by different thicknesses of the dielectric layer 66. In other words, the gate insulating layer has the stepped structure so as to expose the partly of the first substrate 60 and the passivation layer has the stepped structure so as to both expose the part of the gate insulating layer and the part of the first substrate 60 to formed the stepped structure of the dielectric layer 66. A method of the embodiment uses gaps of three layers between the gate insulating layer of the thin-film transistor 63, the dielectric layer 66 and the first substrate 60 to make the dielectric layer 66 in the transmission region 622 have a first thickness, a second thickness, and a third thickness so as to form the first capacitor $C_1$, the second capacitor $C_2$ and the third capacitor $C_3$. Because the first thickness is substantially smaller than the third thickness, and the third thickness is substantially smaller than the second thickness, the first capacitor $C_1$ is substantially larger than the third capacitor $C_3$, and the third capacitor $C_3$ is substantially larger than the second capacitor $C_2$. For an electrically connected method, the first capacitor $C_1$, the second capacitor $C_2$ and the third capacitor $C_3$ are connected to each other in parallel and then connected to the liquid crystal capacitor in series.

Figure 11:
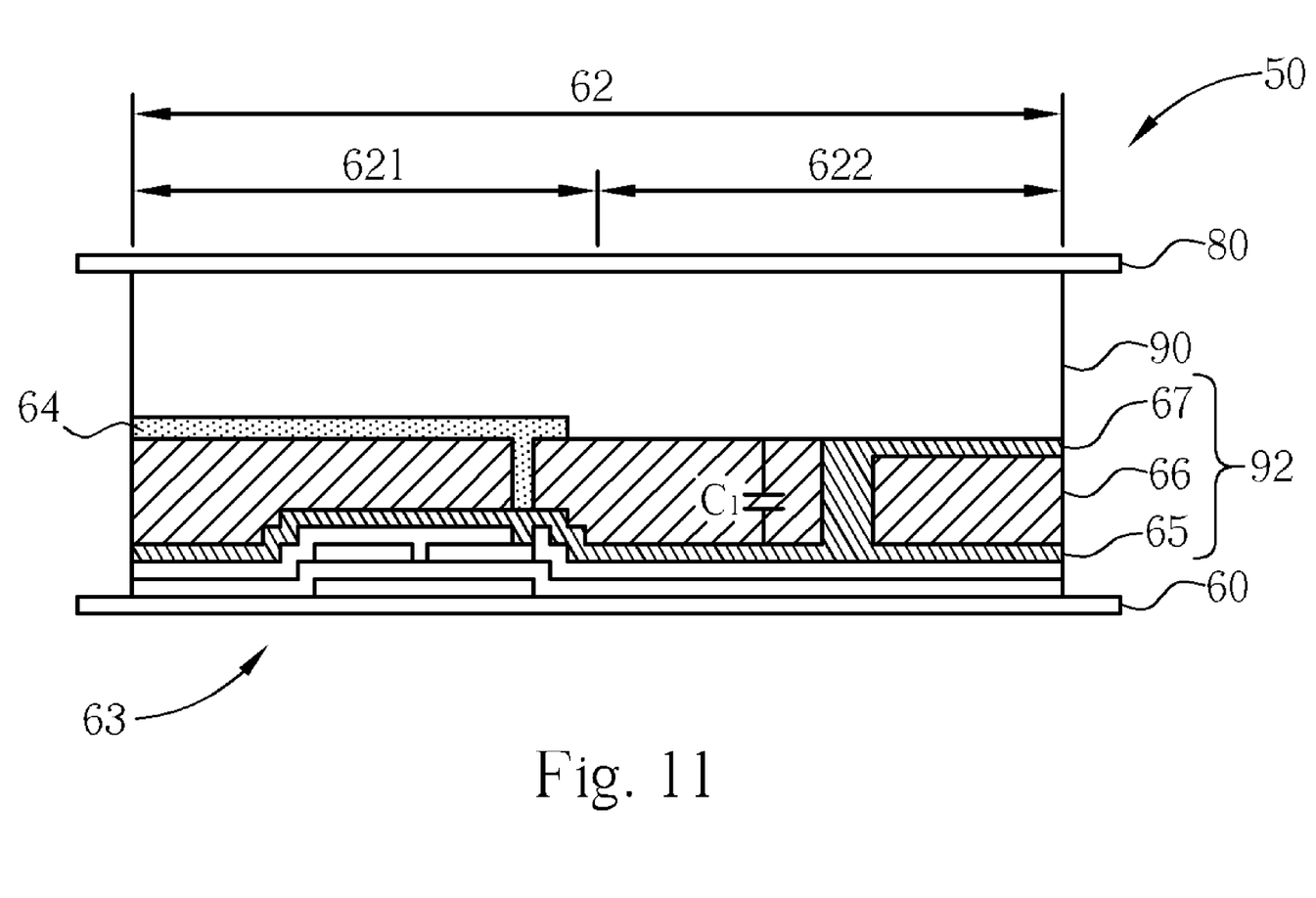
FIG. 11 is a schematic diagram of the voltage dividing structure according to sixth embodiment of the present invention.

FIG. 11 is a schematic diagram of the voltage dividing structure according to sixth embodiment of the present invention. The difference between the voltage dividing structure 92 of the embodiment and of the above-mentioned embodiment is that the capacitor of the voltage dividing structure 92 not only comprises a first electrode and the dielectric layer 66 but also comprises a second electrode 67 disposed between the liquid crystal layer 90 and the dielectric layer 66, and a surface of the second electrode 67 is substantially in the same level with a surface of the dielectric layer 66. In other words, the second electrode 67 is embed into the partly of the dielectric layer 66 and is electrically connected to the transmissive electrode via a hole.

Figure 12:
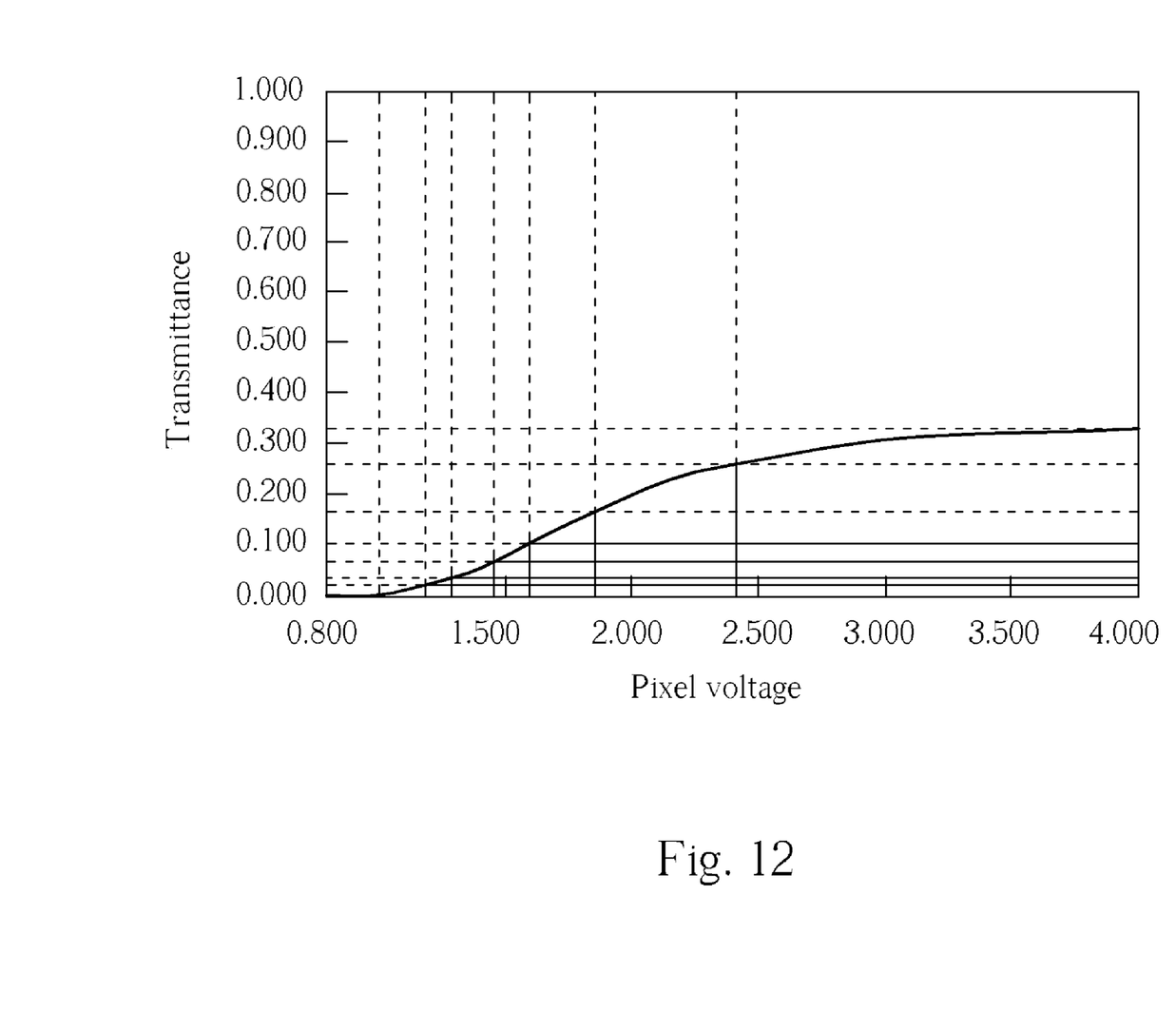
FIG. 12 is a diagram illustrating a relation of the transmittance versus the pixel voltage in the transmission region of the transflective liquid crystal panel disposed a voltage dividing structure.
Figure 13:
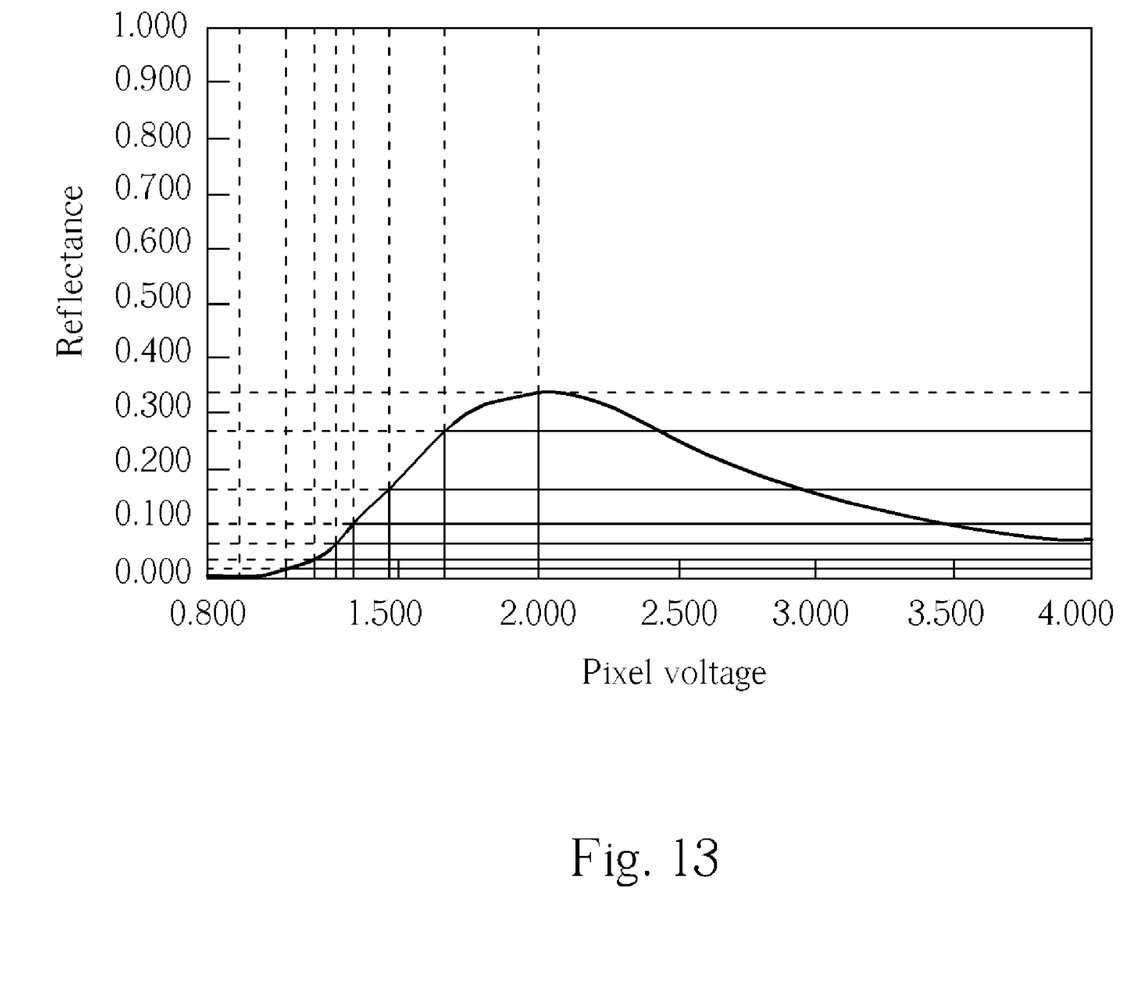
FIG. 13 is a diagram illustrating a relation of the reflectance versus pixel voltage in the reflection region of the transflective liquid crystal panel disposed a voltage dividing structure.

FIG. 12 is a diagram illustrating a relation of the transmittance versus the pixel voltage in the transmission region of the transflective liquid crystal panel disposed a voltage dividing structure. FIG. 13 is a diagram illustrating a relation of the reflectance versus pixel voltage in the reflection region. As shown in FIG. 12 and FIG. 13, in a normal voltage range, such as about 2V to about 2.5V, a curve of the transmittance and the pixel voltage and a curve of the reflectance and the pixel voltage can match each other.

In summary, the pixel structure design of the transflective liquid crystal panel having a single cell gap of the present invention is to make the reflection region and the transmission region have different driving voltages respectively by using a voltage dividing method in the condition of providing the same pixel voltage. Therefore, the liquid crystal molecules in the reflection region and in the transmission region can respectively have different phase differences while being driven, so that a mismatching problem of the driving voltage in the reflection region and in the transmission region is solved effectively.

While the present invention has been described by way of example and in terms of the preferred embodiments, it is to be understood that the present invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure of a transflective liquid crystal panel having a single gap, comprising:
    a first substrate and a second substrate substantially corresponding to the first substrate, wherein the first substrate comprises a plurality of pixel regions, each pixel region comprising at least one reflection region covered with a reflective electrode and at least one transmission region;
    a liquid crystal layer disposed between the first substrate and the second substrate;
    a first quarter-wave plate disposed on a lower surface of the first substrate;
    a first polarizer, disposed under the first quarter-wave plate, having a first transmissive axis;
    a second quarter-wave plate disposed on an upper surface of the second substrate; and
    a second polarizer, disposed on the second quarter-wave plate, having a second transmissive axis, wherein the first transmissive axis of the first polarizer and the second transmissive axis of the second polarizer are substantially parallel to each other;
    wherein as no voltage is applied, the liquid crystal layer in the transmission region and in the reflection region has a phase difference of half wavelength, and wherein as a voltage is applied, the liquid crystal layer in the transmission region has no phase difference, and the liquid crystal layer in the reflection region has a phase difference of quarter wavelength.

2. The pixel structure of claim 1, further comprising a first half-wave plate disposed between the first polarizer and the first quarter-wave plate, and a second half-wave plate disposed between the second polarizer and the second quarter-wave plate.

3. The pixel structure of claim 1, wherein the liquid crystal layer in the transmission region has no phase difference, and the liquid crystal layer in the reflection region has the phase difference of quarter wavelength when a voltage is applied by a voltage dividing.

4. The pixel structure of claim 3, further comprising a plurality of capacitors in series, wherein the voltage dividing is achieved by connecting to the plurality of capacitors.

5. The pixel structure of claim 1, further comprising at least one voltage dividing structure, disposed in the transmission region, comprising at least one capacitor, wherein the at least one capacitor has a first electrode and a dielectric layer disposed between the first electrode and the liquid crystal layer.

6. The pixel structure of claim 5, further comprising a transmissive electrode disposed in the reflection region and in the transmission region, wherein the first electrode of the capacitor is the transmissive electrode of the pixel structure, and the transmissive electrode is electrically connected to the reflective electrode.

7. The pixel structure of claim 6, further comprising a first capacitor formed between the first electrode and the liquid crystal layer in the transmission region, wherein the dielectric layer of the first capacitor in the transmission region has a first thickness.

8. The pixel structure of claim 7, further comprising a second capacitor formed between the transmissive electrode and the liquid crystal layer in the transmission region, wherein the first capacitor is located in the transmission region and adjacent to the reflective electrode, and the dielectric layer of the second capacitor has a second thickness.

9. The pixel structure of claim 8, further comprising a third capacitor positioned between the first capacitor and the second capacitor, wherein the dielectric layer of the third capacitor has a third thickness.

10. The pixel structure of claim 6, wherein the at least one capacitor comprises a second electrode covering a part of the dielectric layer in the transmission region and being electrically connected to the transmissive electrode.

11. The pixel structure of claim 1, further comprising at least one voltage dividing insulating layer disposed on the reflective electrode in the reflection region.

12. The pixel structure of claim 1, further comprising a common electrode layer disposed on a lower surface of the second substrate, and at least one voltage dividing insulating layer disposed between the common electrode layer and the liquid crystal layer in the reflection region.

13. A pixel structure of a transflective liquid crystal panel having a single cell gap, comprising:
   a first substrate and a second substrate substantially corresponding to the first substrate, the first substrate comprising a plurality of pixel regions, each pixel region comprising at least one reflection region covered with a reflective electrode and at least one transmission region; and
   a liquid crystal layer disposed between the first substrate and the second substrate;
   wherein as no voltage is applied, the liquid crystal layer disposed in the transmission region and in the reflection region has a phase difference of half wavelength, and wherein as a voltage is applied, the liquid crystal layer disposed in the transmission region has no phase difference, and the liquid crystal layer in the reflection region has a phase difference of quarter wavelength.

14. The pixel structure of claim 13 further comprising:
   a first quarter-wave plate disposed on a lower surface of the first substrate;
   a first polarizer, disposed under the first quarter-wave plate, having a first transmissive axis;
   a second quarter-wave plate disposed on an upper surface of the second substrate; and
   a second polarizer, disposed on the second quarter-wave plate, having a second transmissive axis.

15. A normally black transflective liquid crystal display incorporating the pixel structure of claim 14.

16. The pixel structure of claim 15, wherein the first transmissive axis of the first polarizer is substantially parallel to the second transmissive axis of the second polarizer.

17. A normally white transflective liquid crystal display incorporating the pixel structure of claim 14.

18. The pixel structure of claim 17, wherein the first transmissive axis of the first polarizer and the second transmissive axis of the second polarizer are non-parallel.

19. The pixel structure of claim 13, further comprising at least one voltage dividing structure, disposed in the transmission region, comprising at least one capacitor, wherein the at least one capacitor having a first electrode and a dielectric layer disposed between the first electrode and the liquid crystal layer.

20. The pixel structure of claim 19, further comprising a transmissive electrode disposed in the reflection region and in the transmission region, wherein the transmissive electrode of the pixel structure acts as the first electrode of the at least one capacitor, and the transmissive electrode and the reflective electrode are electrically connected.

21. The pixel structure of claim 20, further comprising a first capacitor formed between the first electrode and the liquid crystal layer in the transmission region, wherein the dielectric layer of the first capacitor has a first thickness in the transmission region.

22. The pixel structure of claim 21, further comprising a second capacitor formed between the transmissive electrode and the liquid crystal layer in the transmission region, wherein the first capacitor is located in the transmission region and adjacent to the reflective electrode, and the dielectric layer of the second capacitor has a second thickness.

23. The pixel structure of claim 22, further comprising a third capacitor positioned between the first capacitor and the second capacitor, wherein the dielectric layer of the third capacitor has a third thickness.

24. The pixel structure of claim 20, wherein the at least one capacitor comprises a second electrode covering a part of the dielectric layer in the transmission region and being electrically connected to the transmissive electrode.

25. The pixel structure of claim 13, further comprising at least one voltage dividing insulating layer disposed on the reflective electrode in the reflection region.

26. The pixel structure of claim 13, further comprising a common electrode layer disposed on a lower surface of the second substrate, and at least one voltage dividing insulating layer disposed between the common electrode layer and the liquid crystal layer in the reflection region.

* * * * *